United States Patent
Oe

(10) Patent No.: US 10,594,405 B2
(45) Date of Patent: Mar. 17, 2020

(54) OPTICAL RECEIVER AND METHOD OF CONTROLLING OPTICAL RECEIVER

(71) Applicant: SUMITOMO ELECTRIC INDUSTRIES, LTD., Osaka (JP)

(72) Inventor: Hideki Oe, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/949,218

(22) Filed: Apr. 10, 2018

(65) Prior Publication Data

US 2018/0294889 A1 Oct. 11, 2018

(30) Foreign Application Priority Data

Apr. 11, 2017 (JP) .................. 2017-078264

(51) Int. Cl.
  *H04B 10/60* (2013.01)
  *H04B 10/69* (2013.01)
  *H04J 14/02* (2006.01)

(52) U.S. Cl.
  CPC ......... *H04B 10/60* (2013.01); *H04B 10/6931* (2013.01); *H04J 14/02* (2013.01)

(58) Field of Classification Search
  CPC ...... H04B 10/60; H04B 10/6931; H04J 14/02
  USPC ................................. 398/202–214
  See application file for complete search history.

(56) References Cited

U.S. PATENT DOCUMENTS

| 5,745,276 A | * | 4/1998 | Ho | ..... | H04B 10/6931 |
| | | | | | 250/214 A |
| 7,092,638 B2 | * | 8/2006 | Funami | ..... | H04J 14/0221 |
| | | | | | 14/221 |
| 7,362,498 B1 | * | 4/2008 | Li | ..... | H04B 10/2914 |
| | | | | | 359/341.41 |
| 8,249,464 B2 | * | 8/2012 | Oda | ..... | H04B 10/60 |
| | | | | | 398/162 |

(Continued)

FOREIGN PATENT DOCUMENTS

| JP | 2010-136195 | 6/2010 |
| JP | 2011-172202 | 9/2011 |

*Primary Examiner* — Amritbir K Sandhu
(74) *Attorney, Agent, or Firm* — Smith, Gambrell & Russell, LLP.

(57) ABSTRACT

In an optical receiver, a control unit determines an SOA current set value such that an SOA current becomes a maximum value $I_{SOA\_MAX}$ when a VOA voltage is smaller than a first threshold value $V_{VOA\_LOW}$, determines the SOA current set value such that the SOA current becomes smaller than the maximum value $I_{SOA\_MAX}$ and larger than a minimum value $I_{SOA\_MIN}$ when the VOA voltage is equal to or larger than the first threshold value $V_{VOA\_LOW}$ and is smaller than a second threshold value $V_{VOA\_HIGH}$, and determines the SOA current set value such that the SOA current is fixed to the minimum value $I_{SOA\_MIN}$ when the VOA voltage is equal to or larger than the second threshold value $V_{VOA\_HIGH}$.

20 Claims, 5 Drawing Sheets

(56) References Cited

U.S. PATENT DOCUMENTS

| | | | | |
|---|---|---|---|---|
| 8,290,376 B2* | 10/2012 | Oomori | H04B 10/07955 | 398/202 |
| 8,977,131 B2* | 3/2015 | Yoshida | H04B 10/27 | 398/52 |
| 9,344,199 B2* | 5/2016 | Kawazoe | H04B 10/693 | |
| 9,647,753 B1* | 5/2017 | Kurisu | H04B 10/07957 | |
| 9,722,704 B2* | 8/2017 | Saito | H04B 10/40 | |
| 2002/0060837 A1* | 5/2002 | Inagaki | H01S 3/06758 | 359/337 |
| 2004/0062557 A1* | 4/2004 | Takashima | H04B 10/67 | 398/209 |
| 2004/0247246 A1* | 12/2004 | Lee | H04B 10/27 | 385/48 |
| 2006/0023298 A1* | 2/2006 | Ohshima | H01S 3/06754 | 359/349 |
| 2006/0093362 A1* | 5/2006 | Welch | G02B 6/12004 | 398/87 |
| 2007/0223921 A1* | 9/2007 | Sone | H04Q 11/0005 | 398/45 |
| 2008/0298807 A1* | 12/2008 | Yang | H04Q 11/0067 | 398/98 |
| 2009/0129785 A1* | 5/2009 | Murakami | H01S 3/06754 | 398/160 |
| 2009/0324257 A1* | 12/2009 | Murakami | H04B 10/2916 | 398/200 |
| 2010/0098422 A1* | 4/2010 | Takeda | H04B 10/0777 | 398/79 |
| 2010/0239263 A1* | 9/2010 | Tokura | H04B 10/296 | 398/94 |
| 2011/0182591 A1* | 7/2011 | Ikeuchi | H04B 10/673 | 398/208 |
| 2016/0079730 A1* | 3/2016 | Teranishi | H01S 5/50 | 250/216 |
| 2016/0141834 A1* | 5/2016 | Teranishi | H01S 5/50 | 250/552 |

\* cited by examiner

OPTICAL RECEIVER AND METHOD OF CONTROLLING OPTICAL RECEIVER

TECHNICAL FIELD

One aspect of the present invention relates to an optical receiver and a method of controlling an optical receiver.

BACKGROUND

In optical transceivers used for long-distance transmission, the dynamic range of optical receivers is relatively set to be wide in order to cope with both short-distance and long-distance optical transmissions. For example, in an optical transceiver for 100-gigabit Ethernet (for example, 100GBASE-ER4 conforming to the Institute of Electrical and Electronic Engineers (IEEE) standard) applicable to 40-kilometer transmission, the optical modulation amplitude (OMA) receivable by the optical receiver is set to −21.4 dBm to +4.5 dBm in order to cope with transmission distance from 0 to 40 kilometers.

In such an optical receiver, a semiconductor optical amplifier (SOA) amplifies an optical signal to meet a wide dynamic range. The SOA outputs the amplified optical signal to a receiver optical sub assembly (ROSA) having a light receiving element built in. Specifically, the SOA amplifies the optical signal such that the amplified optical signal falls within an optical power range (dynamic range) in which the amplified optical signal can be received by the ROSA with an allowable error rate or no error. That is, the SOA amplifies the optical signal with a high amplification factor (high gain) when the optical input power of the optical signal received from the outside is relatively small, and amplifies the optical signal with a low amplification factor (low gain) when the optical input power of the received optical signal is relatively large. The amplification allows the amplified optical signal to fall within the dynamic range of ROSA. For example, Japanese Unexamined Patent Publication No. 2011-172202 and Japanese Unexamined Patent Publication No. 2010-136195 disclose techniques for controlling a current (SOA current) for driving an SOA to adjust a gain (SOA gain) of the SOA and to cause optical input power to an ROSA to fall within the dynamic range of the ROSA.

SUMMARY

An optical receiver according to one aspect of the present invention is an optical receiver for receiving an optical reception signal, the optical receiver including a variable optical attenuator configured to output a first optical signal obtained by attenuating the optical reception signal with an attenuation amount increasing or decreasing in accordance with a first control signal, a semiconductor optical amplifier configured to output a second optical signal obtained by amplifying the first optical signal with a gain increasing or decreasing in accordance with a second control signal, an optical receiving unit configured to convert the second optical signal into an electrical signal and output a monitor signal in accordance with the electrical signal, a comparison circuit configured to compare the monitor signal with an output set signal and generate the first control signal in accordance with a result of the comparison, and a control unit configured to generate the second control signal and the output set signal in accordance with the first control signal. The comparison circuit makes the first control signal larger as a difference between the monitor signal and the output set signal becomes larger when the monitor signal is larger than the output set signal, and outputs an output value within a predetermined range as the first control signal when the monitor signal is smaller than the output set signal. The variable optical attenuator makes the attenuation amount large when the first control signal becomes large and makes the attenuation amount small when the first control signal becomes small. The semiconductor optical amplifier makes the gain large when the second control signal becomes large and makes the gain small when the second control signal becomes small. The control unit increases the second control signal by a first increase value within a range smaller than a first upper limit value, and increases the output set signal in accordance with the first increase value within a range smaller than a second upper limit value set in accordance with the first upper limit value, when the first control signal is smaller than a first threshold value, decreases the second control signal by a first decrease value within a range larger than a first lower limit value smaller than the first upper limit value, and decreases the output set signal in accordance with the first decrease value within a range larger than a second lower limit value set in accordance with the first lower limit value, when the first control signal is larger than a second threshold value larger than the first threshold value, and maintains the second control signal and the output set signal when the first control signal falls within a range equal to or larger than the first threshold value and equal to or smaller than the second threshold value.

DETAILED DESCRIPTION

A specific example of an optical receiver according to an embodiment of the present invention will be described below with reference to the drawings. In the description of the drawings, the same element is denoted by the same reference sign, and duplicate description is omitted. Note that the present invention is not limited to these exemplifications and is determined by the claims, and all changes that fall within the meanings and scope of equivalence of the claims therefore are intended to be embraced therein.

Figure 1:
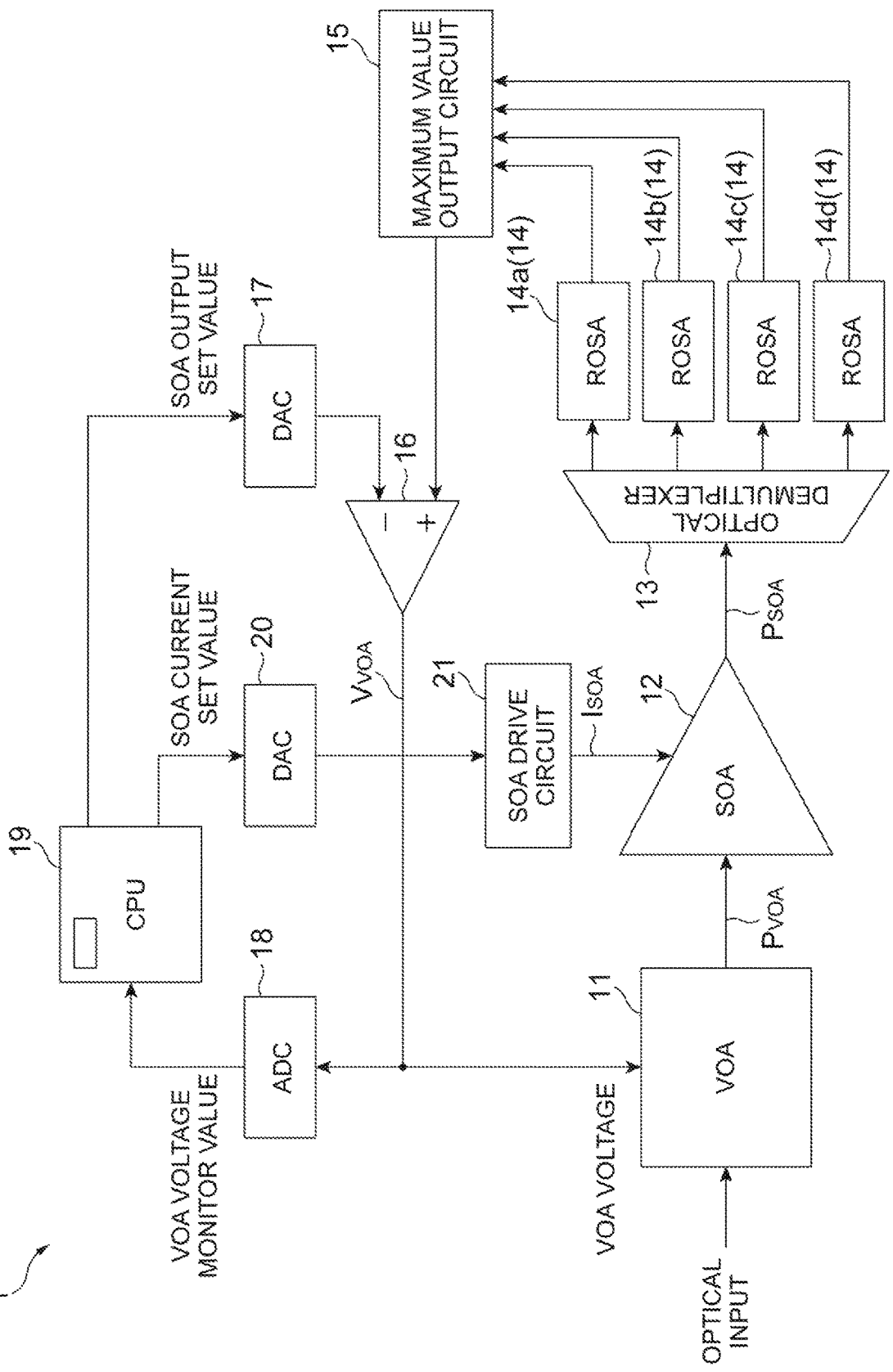
FIG. 1 is a functional block diagram schematically illustrating an optical receiver according to an embodiment of the present invention.

FIG. 1 is a functional block diagram schematically illustrating an optical receiver according to an embodiment of the present invention. An optical receiver 1 is provided in a 100-gigabit optical transceiver that transmits and receives optical signals in a two-core bi-directional manner using four optical signals having different wavelengths from one another, for example. More specifically, the optical receiver 1 is provided in an optical transceiver for 100-gigabit Ethernet (for example, 100GBASE-ER4 by the IEEE standard) applicable to 40-kilometer long-distance transmission, for example. Note that, hereinafter, description will be given on the assumption that the optical receiver 1 is provided in the 100GBASE-ER4. However, the present embodiment is not limited thereto, and the optical receiver 1 may be provided in an optical transceiver defined by a CFP (100Gform-factor Pluggable) 2, CFP4, or the like conforming to the Multi-Source Agreement (MSA) standard, for example. Alternatively, the optical receiver 1 may be provided in a 40-gigabit optical transceiver. Alternatively, the optical receiver 1 may be provided in an optical transceiver other than the above-described optical transceivers for long-distance transmission of a wavelength multiplexed signal (wavelength division multiplexing signal).

The optical receiver 1 receives a wavelength multiplexed signal (hereinafter, also referred to as optical reception signal). The optical reception signal includes four optical signals having different wavelengths from one another. A transmission rate of the optical reception signal is, for example, 100 Gbps or more. The optical receiver 1 demultiplexes the optical reception signal into four optical signals, and converts each demultiplexed optical signal into an electrical signal of 25 Gbps or more and outputs the electrical signals. The four electrical signals of 25 Gbps or more output from the optical receiver 1 are output to a host system (host device). Here, in the optical receiver 1, a dynamic range is set to be relatively wide in order to cope with both short-distance and up to 40-kilometer transmissions. For example, in the optical receiver 1, OMA of a receivable optical reception signal is −21.4 dBm to +4.5 dBm. Namely, the dynamic range of the optical receiver 1 at least covers a range from −21.4 dBm to +4.5 dBm. The optical receiver 1 meets such a wide dynamic range by amplifying the optical reception signal. Hereinafter, a function regarding optical amplification control of the wavelength multiplexed signal (wavelength division multiplexing signal) by the optical receiver 1 will be described in detail. Note that FIG. 1 illustrates a configuration related to the optical amplification control, of configurations of the optical receiver 1, and illustration of configurations regarding other functions is omitted.

As illustrated in FIG. 1, the optical receiver 1 includes a variable optical attenuator (VOA) 11, a semiconductor optical amplifier (SOA) 12, an optical-demultiplexer 13, a receiver optical sub assembly (ROSA) 14, a monitor circuit (maximum value output circuit) 15, a VOA control circuit (comparison circuit) 16, digital to analog converters (DACs) 17 and 20, an analog to digital converter (ADC) 18, a central processing unit (CPU) 19, and an SOA drive circuit 21. Note that the optical-demultiplexer 13, the ROSA 14, and the monitor circuit 15 constitute an optical receiving unit. Further, the DACs 17 and 20, the ADC 18, the CPU 19, and the SOA drive circuit 21 constitute a control unit. Note that the CPU 19 may be a micro controller unit (MCU).

The VOA 11 is an optical attenuator capable of attenuating the optical reception signal input to the optical receiver 1. The VOA 11 outputs an attenuated optical reception signal to the SOA 12. The VOA 11 attenuates the optical reception signal such that an attenuation amount becomes larger as an applied VOA voltage $V_{VOA}$ (details will be described below) is larger, for example. The attenuation amount of the VOA 11 can be defined by a ratio Pvo/Pvi of power Pvo of an optical signal (VOA output signal) output from the VOA 11 to power Pvi of an optical signal input to the VOA 11. An optical signal (first optical signal) in which an output value (optical output power) is Pvo and output from the VOA 11 is input to the SOA 12. The VOA 11 is optically connected to the SOA 12 via an optical fiber cable, for example. The optical signal output from the VOA 11 is input to the SOA 12 via the optical fiber cable.

The SOA 12 is an amplifier that amplifies the optical signal (VOA output signal) output from the VOA 11. The SOA 12 outputs the amplified optical signal to the optical-demultiplexer 13. The SOA 12 amplifies the optical signal input to the SOA 12 such that a gain (SOA gain) becomes larger as a supplied SOA current $I_{SOA}$ (described below in detail) is larger, for example. Further, the gain becomes smaller as the SOA current $I_{SOA}$ is smaller. The SOA gain can be defined by a ratio Pso/Psi of power Pso of an optical signal (SOA output signal) output from the SOA 12 to power Psi of an optical signal input to the SOA 12. An optical signal (second optical signal) in which an output value (optical output power) is $P_{SOA}$ nd output from the SOA 12 is input to the optical-demultiplexer 13. The SOA 12 is optically connected to the optical-demultiplexer 13 via an optical fiber cable, for example. The optical signal output from the SOA 12 is input to the optical-demultiplexer 13 via the optical fiber cable.

By the way, as described above, the gain (amplification factor) of the SOA 12 is determined in accordance with the magnitude of the SOA current. Therefore, to suppress the gain (amplification factor) of the SOA 12 because the optical input power of the optical reception signal received by the optical receiver 1 is relatively large, the magnitude of the SOA current is reduced. Here, a larger optical input power input to the SOA 12 causes a larger optical output power output from the SOA 12. However, the SOA gain becomes degraded as the optical output power from the SOA 12 becomes larger (the optical input power to the SOA 12 becomes larger) under the condition that the magnitude of the SOA current is constant. That is, the optical output power becomes saturated as the optical output power from the SOA 12 becomes very large. Then, when SOA output power of when the SOA gain is decreased by 3 dB from a highest value is defined as a saturated optical output, the value of the saturated optical output becomes smaller as the magnitude of the SOA current is smaller (the SOA current is a lower current). In the case of using the SOA output power exceeding the saturated optical output, waveform distortion due to the pattern effect becomes apparent, and there is a risk that a reception error rate becomes high. As described above, there is a risk that the reception error rate becomes high as the SOA current is reduced.

Further, in the optical receiver 1, the wavelength multiplexed signal (optical reception signal) obtained by multiplexing the plurality of optical signals having different wavelengths from one another is received, the optical reception signal is separated by the optical-demultiplexer 13 at every wavelength (channel), and the separated optical signals are input to the ROSA 14. Wavelength dependence characteristics of the SOA gain depends on the magnitude of the SOA current. More specifically, the wavelength dependence of the SOA gain becomes significant as the magnitude of the SOA current is reduced. Therefore, in the optical transceiver that transmits and receives a plurality of (for example, four-channel) optical signals having different wavelengths from one another, a difference (variation) in optical power among the separated optical signals becomes larger as the magnitude of the SOA current is reduced.

Setting the SOA optical output power so that the any optical power of the separated optical signals falls within the dynamic range of the ROSA 14 becomes more difficult as the difference in optical power among the separated optical signals becomes larger. As described above, a risk that some optical powers of the channels separated from the SOA optical output power falls outside the dynamic range of the ROSA 14 becomes higher as the magnitude of the SOA current is reduced. The SOA 12 is controlled to limit the SOA current to fall within an appropriate range in order to avoid an operating state in which such a reception error rate becomes high and an operation state in which one or more optical powers of the channels separated from the SOA optical output power falls outside the dynamic range of the ROSA 14. Details will be described below.

The optical-demultiplexer 13 separates the optical signal (SOA output signal) output from the SOA 12 into a plurality of optical signals having different wavelengths from one another. The optical-demultiplexer 13 outputs the separated optical signals to the ROSA 14. FIG. 1 illustrates an example in which the wavelength multiplexed signal (optical reception signal) in which four optical signals having different wavelengths from one another are multiplexed is separated into four independent optical signals by the optical-demultiplexer 13, and the four independent optical signals are output to the ROSA 14.

The ROSA 14 converts the optical signals output from the optical-demultiplexer 13 into electrical signals, and outputs the electrical signals to a reception IC (Rx-IC) (not illustrated). FIG. 1 illustrates an example in which the four optical signals separated by the optical-demultiplexer 13 are converted into four electrical signals by the ROSA 14. In the reception IC, for example, the four electrical signals of the transmission rate of 25 Gbps or more are again converted into ten electrical signals of the transmission rate of 10 Gbps or more, and the ten electrical signals are transmitted to the host system via an electrical connector (not illustrated). The ROSA 14 includes a plurality of ROSAs. Each ROSA converts an optical signal having a single wavelength (peak wavelength) into a single electrical signal. For example, the ROSA 14 includes four ROSAs 14a, 14b, 14c, and 14d. The four optical signals output from the optical-demultiplexer 13 are input to the ROSAs 14a, 14b, 14c, and 14d that are respectively corresponding ROSAs. The ROSAs 14a, 14b, 14c, and 14d convert the four mutually independent optical signals output by the optical-demultiplexer 13 into four mutually independent electrical signals, and output the four mutually independent electrical signals. Specifically, each of the ROSAs 14a, 14b, 14c, and 14d includes a light receiving element and a current-voltage conversion circuit (transimpedance amplifier). Then, the optical signal is converted into a current signal by the light receiving element, the current signal is converted into a voltage signal (electrical signal) by the current-voltage conversion circuit, and the voltage signal is output. The dynamic range of the ROSAs 14a, 14b, 14c, and 14d, that is, an optical power range in which an optical signal is receivable with an allowable error rate or no error is common to one another.

Here, in the optical receiver 1, output values (for example, output amplitudes) of the electrical signals output by the ROSAs 14a, 14b, 14c, and 14d are acquired, and strength estimation (optical power monitoring) of the optical signals input to the respective ROSAs is performed from the output values. Specifically, in the optical receiver 1, electrical signals (monitor signals) output by the ROSAs 14a, 14b, 14c, and 14d are input to the monitor circuit (maximum value output circuit) 15, and output values of the electrical signals (monitor signals) are acquired by the monitor circuit 15. The monitor circuit (maximum value output circuit) 15 outputs a signal indicating the maximum output value (monitor signal maximum value) in the output values of the acquired four electrical signals (monitor signals) to the VOA control circuit 16, for example. The monitor signal maximum value is used as a monitor value for feedback control to be described below. Note that an object of the strength estimation is average optical power (a time average value of the optical power) of the optical signals, and thus the electrical signal input to the monitor circuit (maximum value output circuit) 15 may not be the electrical signal (photocurrent) itself that is converted from the optical signal by the light receiving element in the ROSA. For example, another electrical signal having signal strength correlated with the signal strength of the electrical signal may be used. Specifically, a current signal generated (copied) from the photocurrent using a current mirror circuit may be used in place of the electrical signal (photocurrent). Alternatively, the current signal may be further converted into a voltage signal by a resistive element (not illustrated), and the voltage signal may be used.

The VOA control circuit 16 is a circuit that compares the output value of the electrical signal (monitor signal) output by the ROSA 14 with an SOA output set value that is a predetermined comparison value, and outputs a VOA voltage (determination signal) that determines the attenuation amount of the VOA 11 in accordance with a result of the comparison. The VOA control circuit 16 outputs a signal in accordance with a signal indicating the monitor signal maximum value output from the monitor circuit (maximum value output circuit) 15. The SOA output set value is an analog value set by the DAC 17 (details will be described below). The DAC 17 performs digital/analog (DA) conversion for the SOA output set value that is a digital signal output by the CPU 19, and outputs a converted analog value to the VOA control circuit 16.

The VOA control circuit 16 compares the monitor signal maximum value with the SOA output set value, and outputs the VOA voltage such that a voltage value of the VOA voltage $V_{VOA}$ becomes larger as the monitor signal maximum value is larger than the SOA output set value (that is, a difference between the monitor signal maximum value and the SOA output set value is larger). Note that, when the monitor signal maximum value is smaller than the SOA output set value, the VOA control circuit 16 outputs the VOA voltage having an output value that falls within a predetermined range. When the signal (signal indicating the monitor signal maximum value) input from the monitor circuit (maximum value output circuit) 15 and the analog value input from the DAC 17 are substantially equal, the VOA control circuit 16 maintains the VOA voltage to the current value. In this state, the monitor circuit (maximum value output circuit) 15, the DAC 17, and the like are set such that a value of average optical power of the optical signal output from the SOA 12 becomes equal to the SOA output set value. For example, in the optical signal output from the SOA 12, four optical signals are multiplexed, and the optical power of the optical signal is about four times the optical power of a demultiplexed single optical signal input to each ROSA. The SOA output set value is set in consideration of such a relationship. The VOA voltage output by the VOA control circuit 16 is input to the ADC 18 and the VOA 11 via electrical wiring. The ADC 18 performs analog/digital (AD) conversion for the VOA voltage that is an analog signal output by the VOA control circuit 16, and outputs a VOA voltage monitor value that is a converted digital value to the CPU 19.

By the way, a case of performing a method of providing the VOA 11 at a preceding stage (optical input side) of the SOA 12 and controlling the attenuation amount of the VOA 11 such that the optical output power of the SOA 12 falls within the predetermined range, in addition to the method of adjusting the gain of the SOA 12, will be considered. For example, the SOA current and the SOA gain are kept constant, and the attenuation amount of the VOA 11 is controlled such that the optical input power to the ROSA 14 falls within the dynamic range of the ROSA 14. In the case where the optical input power to the optical receiver 1 is large, control to constantly fix the optical input power to the SOA 12 to a low value and to constantly make the gain by the SOA 12 constant in order to set the optical input power to the ROSA 14 to fall within the dynamic range of the ROSA is conceivable. However, in such control, when the optical input power to the optical receiver 1 is large, the optical signal greatly attenuated by the VOA 11 is greatly amplified by the SOA 12. Therefore, there is a risk that the reception error rate becomes high due to an influence of noise when a light source with a low extinction ratio, a stressed waveform, or the like is received. Therefore, the SOA 12 and the VOA 11 are controlled to limit the SOA current and the VOA voltage to fall within appropriate ranges in order to avoid an operating state in which such a reception error rate becomes high. Details will be described below.

The CPU 19 determines an SOA current set value that is a control value for controlling the SOA 12 in accordance with the VOA voltage $V_{VOA}$. The SOA current is generated by the SOA drive circuit 21 in accordance with the SOA current set value, and the gain of the SOA 12 is determined in accordance with the SOA current $I_{SOA}$. Details of determination of the SOA current set value by the CPU 19 will be described below. The CPU 19 outputs the determined SOA current set value to the DAC 20. The DAC 20 performs DA conversion for the SOA current set value that is a digital signal output by the CPU 19, and outputs a converted analog value (voltage value) to the SOA drive circuit 21.

Further, the CPU 19 determines the SOA output set value in accordance with the VOA voltage $V_{VOA}$ and the SOA current set value. The voltage value of the VOA voltage $V_{VOA}$ output from the VOA control circuit 16 is determined in accordance with the SOA output set value. Details of determination of the SOA output set value by the CPU 19 will be described below.

The SOA drive circuit 21 is a circuit that generates the SOA current (control current) in accordance with the SOA current set value and outputs the SOA current to the SOA 12. The SOA current is a current for driving the SOA 12. The gain of the SOA 12 becomes larger as the SOA current $I_{SOA}$ is larger. That is, a ratio (gain) of the power of the optical signal output from the SOA 12 to the power of the optical signal input to the SOA 12 becomes larger as the SOA current $I_{SOA}$ is larger.

Figure 2A:
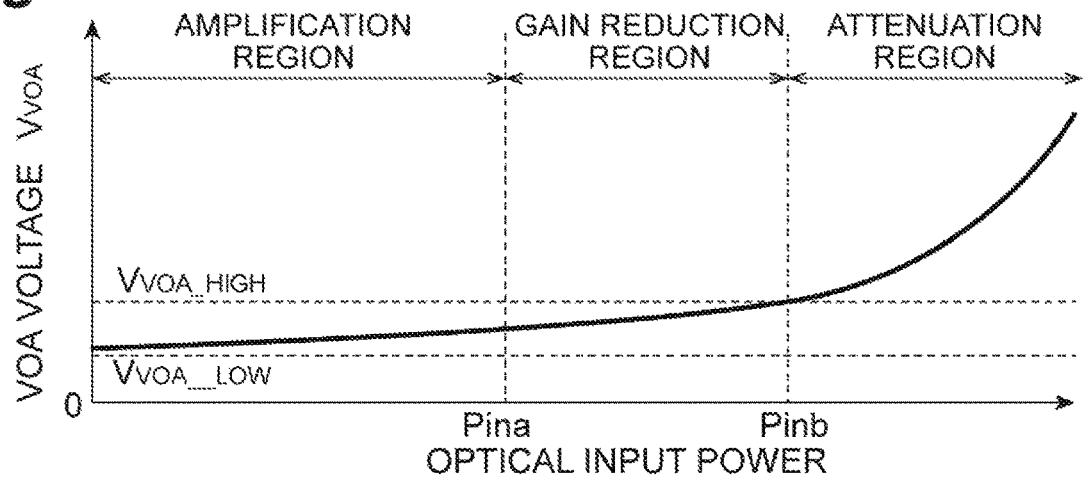
FIG. 2A is a diagram illustrating a relationship between optical input power and a VOA voltage $V_{VOA}$ in the optical receiver 1 in FIG. 1.
Figure 2B:
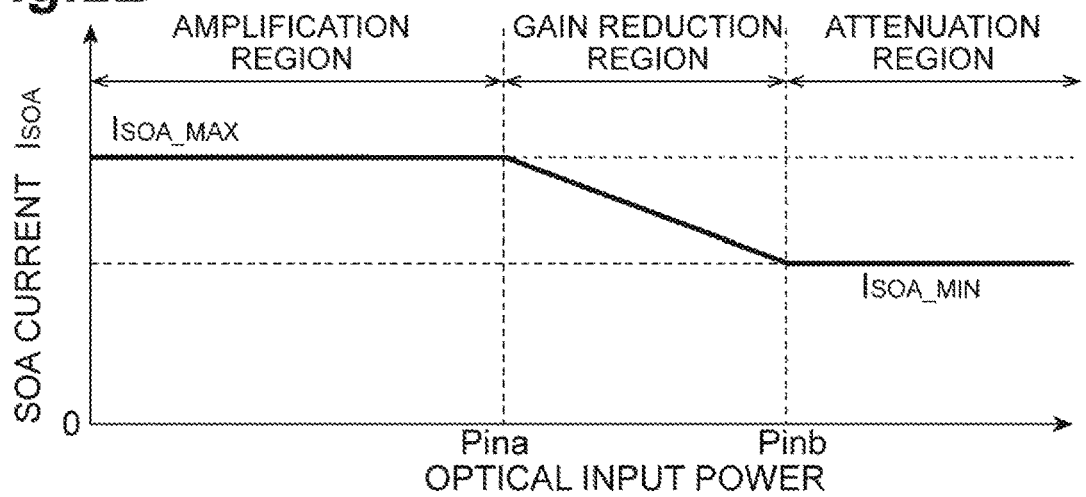
FIG. 2B is a diagram illustrating a relationship between optical input power and an SOA current $I_{SOA}$ in the optical receiver 1 in FIG. 1.
Figure 2C:
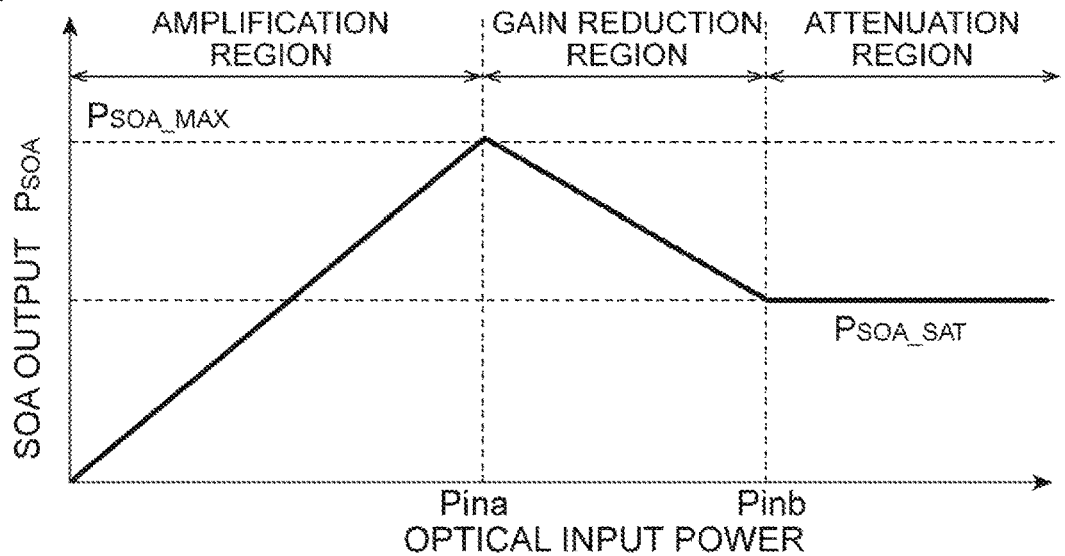
FIG. 2C is a diagram illustrating a relationship between optical input power and an SOA output $P_{SOA}$ in the optical receiver 1 in FIG. 1.

Next, details of determination of the SOA output set value and the SOA current set value by the CPU 19 will be described with reference to FIG. 1 and FIGS. 2A to 2C. FIG. 2A is a diagram illustrating a relationship between the optical input power and the VOA voltage $V_{VOA}$ in the optical receiver 1 in FIG. 1. FIG. 2B is a diagram illustrating a relationship between the optical input power and the SOA current $I_{SOA}$ in the optical receiver 1 in FIG. 1. FIG. 2C is a diagram illustrating a relationship between the optical input power and SOA output power $P_{SOA}$ in the optical receiver 1 in FIG. 1. Note that, hereinafter, description will be given on the assumption that an optical reception signal (wavelength multiplexed signal) having optical input power that gradually becomes larger as time proceeds is input to the optical receiver 1.

The CPU 19 determines the SOA output set value and the SOA current set value on the basis of the method for each of three regions according to the range of the optical input power of the optical reception signal input to the optical receiver 1. The three regions are an amplification region, a gain reduction region, and an attenuation region in ascending order of the optical input power.

The amplification region is a region in which the optical input power of the optical receiver 1 is relatively small (for example, a region where the optical output power from the SOA 12 reaches a predetermined upper limit value when the attenuation amount of the VOA 11 is set to fall within a predetermined attenuation set range). Here, the predetermined attenuation set range is, for example, equal to or larger than the attenuation amount of when the VOA voltage $V_{VOA}$ is set to a first threshold value $V_{VOA\_LOW}$ and is equal to or smaller than the attenuation amount of when the VOA voltage $V_{VOA}$ is set to a second threshold value $V_{VOA\_HIGH}$. The amplification region is a region controlled such that the output value $P_{SOA}$ of the optical output power from the SOA 12 becomes larger (monotonically increases) as the optical input power becomes larger. Note that, in the amplification region, the VOA voltage $V_{VOA}$ becomes transiently equal to or lower than the first threshold value $V_{VOA\_LOW}$ in some cases. In the amplification region, the CPU 19 maintains the attenuation amount of the optical reception signal by the VOA 11 to fall within the above-described attenuation set range and performs control to make the gain of the wavelength multiplexed signal by the SOA 12 large. More specifically, in this amplification region, the SOA current $I_{SOA}$ is set to a maximum value $I_{SOA\_MAX}$ such that the gain of the SOA 12 is set to a predetermined upper limit value (maximum value). The upper limit value $P_{SOA\_MAX}$ can be converted into a boundary value Pina of corresponding optical input power (a first boundary value of the optical input power) from the SOA gain set by the maximum value $I_{SOA\_MAX}$ of the SOA current and the attenuation amount of the VOA 11 within the attenuation set range when the SOA output $P_{SOA}$ reaches a predetermined upper limit value (maximum value) $P_{SOA\_MAX}$. For example, the following expression is established where the optical input power is Pin (dBm), the attenuation amount of the VOA is L (dB), the gain of the SOA is G (dB), and the optical output power of the SOA is $P_{SOA}$ (dBm).

$$P_{SOA}=Pin-L+G$$

From this expression, Pina can be obtained by $$Pina=P_{SOA\_MAX}-Gmax+L$$

Here, Gmax represents the maximum value of the SOA gain G of when the SOA current is set to the maximum value $I_{SOA\_MAX}$. The first boundary value Pina of the optical input power indicates the boundary between the amplification region and the gain reduction region to be described below.

The CPU 19 performs control such that the VOA voltage $V_{VOA}$ falls within a predetermined voltage set range (for example, equal to or larger than the first threshold value $V_{VOA\_LOW}$ and equal to or smaller than the second threshold value $V_{VOA\_HIGH}$) in the amplification region. The amplification region is, as described above, the region in which the SOA current $I_{SOA}$ is set to the maximum value $I_{SOA\_MAX}$, and the gain of the SOA 12 is set to the predetermined upper limit value (maximum value Gmax). While the optical input power is relatively small in the amplification region, the optical receiver 1 sets the attenuation amount of the VOA 11 to fall within the above-described attenuation set range and sets the gain of the SOA 12 to the upper limit value, and performs optical amplification control to make the magnitude of the SOA output as large as possible with respect to the optical output power. Note that the first threshold value $V_{VOA\_LOW}$ is a voltage value of the VOA voltage $V_{VOA}$ for setting the attenuation amount of the optical reception signal by the VOA 11 to a value larger than a minimum attenuation amount. That is, in the amplification region, the VOA voltage $V_{VOA}$ is controlled to be larger than the first threshold value $V_{VOA\_LOW}$ and smaller than the second threshold value $V_{VOA\_HIGH}$, whereby the attenuation amount of the optical reception signal by the VOA 11 can be made small to an practically acceptable extent although larger than the minimum attenuation amount. By such a setting, the actual SOA output power $P_{SOA}$ is slightly larger than the SOA output set value. For example, if the VOA voltage $V_{VOA}$ is controlled to be equal to or lower than the first threshold value $V_{VOA\_LOW}$, and if the SOA output power $P_{SOA}$ is smaller than the SOA output set value, such a state is maintained. Therefore, it is difficult to bring the SOA output power $P_{SOA}$ closer to the SOA output set value using the VOA voltage $V_{VOA}$. Note that the first threshold value $V_{VOA\_LOW}$ may be a value having a predetermined margin in consideration of the stability and noise tolerance of the VOA voltage that is the output of the VOA control circuit 16, and the accuracy of the ADC 18, with respect to the VOA voltage $V_{VOA}$ that gives the minimum attenuation amount.

Further, the CPU 19 performs control such that the SOA current $I_{SOA}$ becomes the maximum value $I_{SOA\_MAX}$ (current upper limit value) in a steady state in the amplification region. Here, the steady state is a state in which the voltage value related to the VOA, the current value related to the SOA, and the like are operated for several seconds or more while being kept to substantially constant values, under constant environmental conditions such as a temperature and constant operating conditions such as a power supply voltage regarding the optical transceiver, for example. The maximum value of the SOA current $I_{SOA\_MAX}$ is a current value of the SOA current $I_{SOA}$ for causing the SOA output power $P_{SOA}$ to be the maximum value $P_{SOA\_MAX}$ when the optical input power of the optical reception signal is equal to the above-described first boundary value Pina. Alternatively, the maximum value $I_{SOA\_MAX}$ of the SOA current is a current value $I_{SOA}$ for causing the SOA gain to be the predetermined upper limit value (maximum value Gmax). The maximum value $I_{SOA\_MAX}$ of the SOA current is a value by which the power value after separation by the optical-demultiplexer 13 falls within the dynamic range of the ROSA 14 with light of the SOA output power that has reached the maximum value $P_{SOA\_MAX}$, and is, for example, 100 to 150 mA. In the amplification region, the current value of the SOA current $I_{SOA}$ is set to the maximum value $I_{SOA\_MAX}$ in the steady state. With the setting, the power of the SOA output becomes larger as the optical input power becomes larger. When the optical input power reaches the first boundary value Pina, the SOA output power $P_{SOA}$ approximately reaches the maximum value $P_{SOA\_MAX}$. At this time, the power after the separation by the optical-demultiplexer 13 of the SOA output is adjusted to be smaller than the upper limit of the dynamic range of the ROSA 14.

However, for example, if the attenuation amount of the VOA 11 is set to the minimum attenuation amount and the SOA current $I_{SOA}$ is set to the upper limit value (maximum value) $I_{SOA\_MAX}$ as an initial state after power-on or at the time of restart by initialization such as reset, there is a possibility that excessive optical power is input to the ROSA 14 when large optical input power exceeding the first boundary value Pina is input. Therefore, in the initial state, the SOA current set value is set to a small value so that excessive optical power is not input to the ROSA 14, and control is performed to gradually increase the SOA current set value in accordance with the magnitude of the optical input power. Specifically, in the initial state, the CPU 19 sets the SOA current set value to be a sufficiently small value (e.g. zero) so that the output value $P_{SOA}$ of the SOA output does not exceed an upper limit value of a ROSA overload standard even if the optical input power that reaches an upper limit value of an overload standard of the optical receiver 1 is input. Then, while the VOA voltage $V_{VOA}$ is smaller than the first threshold value $V_{VOA\_LOW}$, the SOA current set value is output to the DAC 20 to increase the SOA current $I_{SOA}$ by a predetermined step width a (first increase value). Here, the SOA output set value is increased in accordance with the step width a of the SOA current at the same time with increasing the SOA current set value. Eventually, in repetition of the increase with the step width a, the current value of the SOA current $I_{SOA}$ reaches the maximum value $I_{SOA\_MAX}$, and the SOA output power $P_{SOA}$ becomes a value having the magnitude in accordance with the optical input power, the value being smaller than the maximum value $P_{SOA\_MAX}$. At this time, the voltage value of the VOA voltage $V_{VOA}$ exceeds the first threshold value $V_{VOA\_LOW}$ when the actual SOA output power is slightly larger than the SOA output set value. Therefore, the SOA output set value can be substantially equal to (although slightly larger than) the actual SOA output power by adjusting the SOA output set value such that the voltage value of the VOA voltage $V_{VOA}$ falls within the above-described voltage set range. More specifically, when the SOA output set value is smaller than the actual SOA output power, the VOA voltage $V_{VOA}$ output from the VOA control circuit 16 increases, but the CPU 19 sets the SOA output set value to cancel the increase in the voltage value of the VOA voltage $V_{VOA}$ with the increase in the SOA current set value. That is, in setting the SOA current set value, the CPU 19 outputs a new SOA output set value (an SOA output set value with an increased value) to the DAC 17 so that the increment in the VOA voltage $V_{VOA}$ is canceled. Then, when the VOA voltage $V_{VOA}$ falls within the above-described voltage set range, the previous value is maintained for the SOA output set value. With the operation, even when the SOA current set value is increased in the amplification region, the VOA voltage $V_{VOA}$ can be maintained within the voltage set range. In this manner, when the state reaches the steady state from the initial state as time passes in the amplification region, the VOA voltage $V_{VOA}$ falls within the above-described voltage set range (see FIG. 2A), the current value of the SOA current $I_{SOA}$ is equal to the maximum value $I_{SOA\_MAX}$ (see FIG. 2B), and the SOA output power $P_{SOA}$ becomes a value obtained by attenuating the optical input power with the attenuation amount within the attenuation set range of the VOA 11 and amplifying the optical input power with the maximum gain (upper limit gain) in accordance with the maximum value $I_{SOA\_MAX}$ of the SOA 12 (see FIG. 2C). By the way, when the optical input power is larger than the first boundary value Pina, the SOA output power $P_{SOA}$ reaches the maximum value $P_{SOA\_MAX}$ before the current value of the SOA current $I_{SOA}$ increases with the step width and reaches the maximum value $I_{SOA\_MAX}$. Therefore, optical amplification control is performed as the gain reduction region or the attenuation region described below.

In a transient state in which the SOA current $I_{SOA}$ is increased by the step width a from a set value in the initial state, the CPU 19 continuously increases the current value of the SOA current $I_{SOA}$ by the predetermined step width a, and thus the SOA current $I_{SOA}$ gradually approaches the maximum value $I_{SOA\_MAX}$. When the step width a is excessively made large, a variation amount of the voltage value of the VOA voltage $V_{VOA}$, which varies with the increase in the SOA current $I_{SOA}$, becomes large. Therefore, the value of the step width a may be set to a small value to a certain extent. For example, since the SOA current $I_{SOA}$ has a value of roughly several tens to several hundred mA, the step width a may be set to about 0.1 to 0.5 mA. Note that the step width a may be determined in consideration of the measurement accuracy of the voltage value of the VOA voltage $V_{VOA}$ and the time assumed to be required to reach a convergence value of the voltage value $V_{VOA}$ (that is, the first threshold value $V_{VOA\_LOW}$).

Next, when the optical input power becomes larger than the first boundary value Pina and the SOA output set value becomes likely to exceed the maximum value $P_{SOA\_MAX}$ (or when the SOA output set value becomes a state to exceed the maximum value $P_{SOA\_MAX}$ in the next step), the CPU 19 determines an end point of the amplification region (a boundary point with the gain reduction region), and sets the SOA output set value such that the VOA voltage $V_{VOA}$ output from the VOA control circuit 16 does not become larger than the second threshold value $V_{VOA\_HIGH}$. More specifically, the CPU 19 sets the current value of the SOA current and the SOA output set value (to make the values smaller than those set in a previous step) such that the VOA voltage $V_{VOA}$ smaller than the second threshold value $V_{VOA\_HIGH}$ is output from the VOA control circuit 16 when the monitor signal maximum value of when the SOA output power $P_{SOA}$ becomes the maximum value $P_{SOA\_MAX}$ (or of when the SOA output power $P_{SOA}$ exceeds the maximum value $P_{SOA\_MAX}$ with respect to the current value of the SOA current $I_{SOA}$ increased in the next step) is input to the VOA control circuit 16. When the SOA output set value is set, the VOA voltage $V_{VOA}$ (monitor value) equal to or larger than the second threshold value $V_{VOA\_HIGH}$ is input to the CPU 19, and the optical amplification processing is transitioned from the amplification region to the gain reduction region. That is, in the amplification region where the voltage value of the VOA voltage $V_{VOA}$ is larger than the first threshold value $V_{VOA\_LOW}$ and is smaller than the second threshold value $V_{VOA\_HIGH}$ (in steady state), the CPU 19 determines the SOA current set value such that the current value of the SOA current $I_{SOA}$ becomes the maximum value $I_{SOA\_MAX}$.

The gain reduction region is a region in which the optical input power is larger than the first boundary value Pina, and the SOA output power $P_{SOA}$ is controlled to become smaller as the optical input power becomes larger to cause the VOA voltage $V_{VOA}$ to fall within the above-described voltage set range. In the gain reduction region, the CPU 19 performs control to decrease the SOA current $I_{SOA}$ as the optical input power becomes larger to make the SOA output power $P_{SOA}$ small. At this time, the CPU 19 performs control to make the SOA current $I_{SOA}$ smaller than the maximum value $I_{SOA\_MAX}$ and larger than a minimum value $I_{SOA\_MIN}$. The reason why the SOA current $I_{SOA}$ is controlled to be larger than the minimum value $I_{SOA\_MIN}$ in the gain reduction region will be described below.

To suppress the SOA gain of the SOA 12 because the optical input power to the optical receiver 1 is relatively large, the SOA current $I_{SOA}$ is reduced. Here, when the optical input power to the SOA 12 becomes large, the output value $P_{SOA}$ of the SOA output becomes larger accordingly. However, an increase amount of the SOA output power $P_{SOA}$ becomes smaller than an increase amount of the optical input power to the SOA 12 as the optical input power to the SOA 12 becomes larger under the condition that the magnitude of the SOA current is made constant. That is, the SOA gain becomes easily decreased as the SOA output power $P_{SOA}$ becomes larger (the optical input power to the SOA 12 becomes larger). Then, when SOA output of when the SOA gain is decreased by 3 dB from a highest value is defined as a saturated optical output, the saturated optical output power becomes smaller as the SOA current $I_{SOA}$ is smaller (the SOA current is a lower current). In the case of using the SOA output power exceeding the saturated optical output, waveform distortion due to the pattern effect becomes apparent, and there is a risk that the reception error rate becomes high. As described above, there is a risk that the reception error rate becomes high as the SOA current $I_{SOA}$ is made excessively small.

Further, in the optical receiver 1, the wavelength dependence characteristics of the SOA gain vary according to the magnitude of the SOA current $I_{SOA}$. More specifically, the degree of wavelength dependence of the SOA gain becomes larger as the SOA current $I_{SOA}$ is smaller. Therefore, even when the optical power of the optical signals of wavelengths (channels) of the optical reception signal when received by the optical receiver 1 is equal to one another, the difference in the optical input power among the optical signals in the ROSA 14 becomes larger as the SOA current $I_{SOA}$ is smaller. When there is a difference in the optical input power among the optical signals of the ROSA 14, optical power needs to fall within the dynamic range of the ROSA 14, including the difference. Therefore, causing the output value after separation of the SOA output to fall within the dynamic range of each channel of the ROSA 14 becomes difficult.

The minimum value $I_{SOA\_MIN}$ of the SOA current is set to a large value to the extent that an increase in the reception error rate, and an increase in the risk that the output power value of each optical signal after separation of the SOA output by the optical-demultiplexer 13 falls outside the dynamic range of the ROSA 14 do not become problems, and the SOA current $I_{SOA}$ is controlled to become larger than the predetermined minimum value $I_{SOA\_MIN}$, whereby the increase in the reception error rate and the increase in the risk that the output value after separation of the SOA output falls outside the dynamic range of ROSA 14 can be suppressed. Note that, in the gain reduction region, the SOA output power $P_{SOA}$ of when the current value of the SOA current $I_{SOA}$ is the minimum value $I_{SOA\_MIN}$, is a minimum value $P_{SOA}$_SAT. Further, when the SOA output power $P_{SOA}$ is the minimum value $P_{SOA}$_SAT, the minimum value $P_{SOA}$_SAT can be converted into a boundary value Pinb of the optical input power corresponding to the minimum value $P_{SOA}$_SAT (into a second boundary value of the optical input power) using the SOA gain of when the SOA current is the minimum value $I_{SOA\_MIN}$ and an attenuation value set with the VOA voltage in the VOA 11. The second boundary value Pinb of the optical input power indicates a boundary between the gain reduction region and the attenuation region described below. That is, when the optical input power is between the first boundary value Pina and the second boundary value Pinb, the input optical power range becomes the gain reduction region, and control to suppress the above-described SOA gain is performed as optical amplification processing control.

Specifically, in the case where the VOA voltage $V_{VOA}$ transiently has a magnitude equal to or larger than the second threshold value $V_{VOA\_HIGH}$ when the optical input power is larger than the boundary value Pina and smaller than the boundary value Pinb, the CPU 19 acquires the current SOA current set value in order to perform control with a step width described below. When the SOA current $I_{SOA}$ is set to a value larger than the minimum value $I_{SOA\_MIN}$ according to the SOA current set value, the CPU 19 outputs the SOA current set value to the DAC 20 to decrease the SOA current $I_{SOA}$ by a predetermined step width x (a first decrease value). In addition, the CPU 19 outputs the SOA output set value decreased by a predetermined value in accordance with the predetermined step width x to the DAC 17. That is, in the gain reduction region, in decreasing the current value of the SOA current $I_{SOA}$ by decreasing the SOA current set value, the SOA output set value is decreased together. This is performed because the SOA output power $P_{SOA}$ is decreased with the decrease in the SOA current $I_{SOA}$ in the gain reduction region, as illustrated in FIGS. 2B and 2C. In this manner, by decreasing the SOA output set value together when the electrical signal (monitor signal) maximum value is decreased with the decrease in the SOA current $I_{SOA}$, the VOA voltage $V_{VOA}$ is made smaller than the second threshold value $V_{VOA\_HIGH}$ to suppress the attenuation amount of the VOA 11 becoming a state exceeding the above-described attenuation amount set region. Note that, in the gain reduction region, the CPU 19 continuously decreases the current value of the SOA current $I_{SOA}$ by the predetermined step width x, and therefore, SOA current $I_{SOA}$ gradually approaches the minimum value $I_{SOA\_MIN}$ as the optical input power becomes larger. When the SOA current $I_{SOA}$ and the SOA output set value reach the minimum value $I_{SOA\_MIN}$ and the minimum value $P_{SOA\_SAT}$ when decreasing the aforementioned values, the respective minimum values are maintained.

When the SOA current $I_{SOA}$ reaches the minimum value $I_{SOA\_MIN}$ (or the current value of the SOA current $I_{SOA}$ becomes smaller than the minimum value $I_{SOA\_MIN}$ in the next step) by gradually decreasing the SOA current set value and the SOA output set value by the above-described step width, the VOA voltage $V_{VOA}$ (monitor value) that is equal to or larger than the second threshold value $V_{VOA\_HIGH}$ is input to the CPU 19. That is, the second threshold value $V_{VOA\_HIGH}$ is the voltage value $V_{VOA}$ of when the optical input power becomes equal to the second boundary value Pinb in the steady state, and the SOA current $I_{SOA}$ becomes the minimum value $I_{SOA\_MAX}$. When the optical input power is larger than the boundary value Pina and the VOA voltage $V_{VOA}$ that is equal to or larger than the second threshold value $V_{VOA\_HIGH}$ is input to the CPU 19 including the transient state, the optical amplification processing is transitioned from the gain reduction region to the attenuation region. That is, in the gain reduction region, the CPU 19 sets the SOA current set value such that the SOA current $I_{SOA}$ becomes smaller than the maximum value $I_{SOA\_MAX}$ and becomes larger than the minimum value $I_{SOA\_MIN}$.

The attenuation region is a region in which the optical input power to the optical receiver 1 is larger than that in the gain reduction region, a set value of the SOA output power is set to the minimum value $P_{SOA\_SAT}$, and the increase in the output value $P_{SOA}$ is suppressed with respect to the increase in the optical input power, mainly by the attenuation of the VOA 11. As described above, in the gain reduction region, the SOA output power $P_{SOA}$ is suppressed by making the SOA current $I_{SOA}$ smaller to the minimum value $I_{SOA\_MIN}$ as the optical input power to the optical receiver 1 becomes larger. However, in the case where the optical input power further becomes larger from the gain reduction region and the VOA voltage $V_{VOA}$ becomes equal to or larger than the second threshold value $V_{VOA\_HIGH}$ (in the case where the gain reduction region is transitioned to the attenuation region), the SOA current $I_{SOA}$ cannot be made smaller than the minimum value $I_{SOA\_MIN}$ in order to avoid the above-described saturated optical output state. Therefore, in the attenuation region, the SOA current $I_{SOA}$ is fixed to the minimum value $I_{SOA\_MIN}$ by the CPU 19.

Specifically, when the VOA voltage $V_{VOA}$ is equal to or larger than the second threshold value $V_{VOA\_HIGH}$, the CPU 19 outputs the SOA current set value for setting the SOA current $I_{SOA}$ to the minimum value $I_{SOA\_MIN}$ to the DAC 20. That is, when the VOA voltage $V_{VOA}$ is equal to or larger than the second threshold value $V_{VOA\_HIGH}$, the CPU 19 determines the SOA current set value such that the current value of the SOA current $I_{SOA}$ is constantly fixed to the minimum value $I_{SOA\_MIN}$. Further, when the VOA voltage $V_{VOA}$ is equal to or larger than the second threshold value $V_{VOA\_HIGH}$, the CPU 19 outputs the SOA output set value corresponding to the SOA current set value for setting the SOA current $I_{SOA}$ to the minimum value $I_{SOA\_MIN}$ to the DAC 17. That is, when the VOA voltage $V_{VOA}$ is equal to or larger than the second threshold value $V_{VOA\_HIGH}$, the CPU 19 constantly sets the SOA output set value to a substantially constant value.

In the attenuation region, in the state where both the SOA current set value and the SOA output set value are fixed, the SOA output power $P_{SOA}$ slightly increases as the optical input power becomes larger. As a result, the monitor signal maximum value slightly increases, and the VOA voltage $V_{VOA}$ increases. For example, when an integrating circuit is provided in the VOA control circuit 16, the voltage value of the VOA voltage $V_{VOA}$ can be increased even if the increase amount of the monitor signal maximum value is small. Since the optical reception signal to be input to the optical receiver 1 is attenuated by the VOA voltage with the increased voltage value of the VOA voltage $V_{VOA}$, the increase in the output value $P_{SOA}$ of the SOA output can be suppressed. Note that the increase amount of the optical input power is larger than the increase amount of the attenuation amount of the VOA 11 with the increase in the VOA voltage $V_{VOA}$. Therefore, the SOA output power $P_{SOA}$ gradually increases and the VOA voltage $V_{VOA}$ also gradually increases although the increases are slight. The gradually increasing amounts at this time are suppressed to be smaller as the gain of the VOA control circuit 16 is larger.

Figure 3:
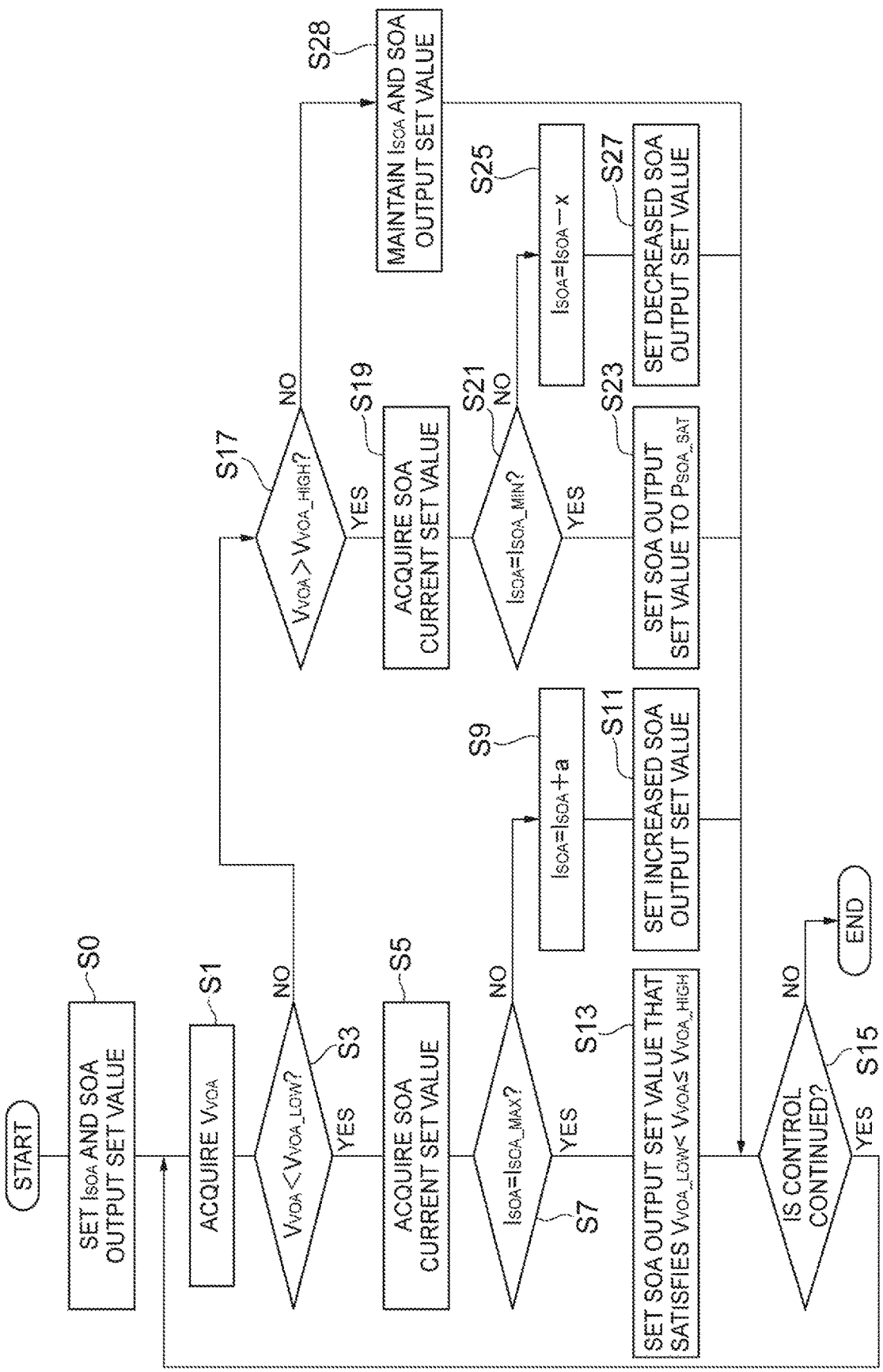
FIG. 3 is a flowchart illustrating an example of optical amplification control by the optical receiver in FIG. 1.

Next, the optical amplification control by the optical receiver 1 (more specifically, by the CPU 19) will be described with reference to FIG. 3. FIG. 3 is a flowchart illustrating an example of the optical amplification control by the optical receiver 1 in FIG. 1.

First, as initial setting, the SOA current set value is set to a sufficiently small value (e.g. zero) so that the SOA output power $P_{SOA}$ does not exceed the upper limit value of the ROSA overload standard even if the optical input power that reaches the upper limit value of the overload standard of the optical receiver 1 is input, and the SOA output set value is set to a sufficiently small value (step S0). Assuming a situation in which what type of wavelength multiplexed signal with optical input power is to be received after power is supplied to the optical receiver 1 to activate or restart the optical receiver 1 cannot be predicted. Therefore, by setting the initial values as described above, even if relatively large optical input power that should be processed in the attenuation region is received, the ROSA 14 can be protected from an input of excessive optical input power.

Next, the CPU 19 acquires the VOA voltage $V_{VOA}$ for which the analog/digital (AD) conversion has been performed by the ADC 18 (step S1). Next, the CPU 19 determines whether the VOA voltage $V_{VOA}$ is smaller than the first threshold value $V_{VOA\_LOW}$ (step S3). When the VOA voltage $V_{VOA}$ is determined to be smaller than the first threshold value $V_{VOA\_LOW}$ in step S3, the CPU 19 acquires the SOA current set value (step S5). Then, the CPU 19 determines whether the SOA current set value is a value that sets the current value of the SOA current $I_{SOA}$ to the maximum value $I_{SOA\_MAX}$ (step S7).

In step S7, when the SOA current set value is determined to set the SOA current $I_{SOA}$ to a value smaller than the maximum value $I_{SOA\_MAX}$, the CPU 19 sets the SOA current set value that increases the SOA current $I_{SOA}$ by the predetermined step width (increase value) a (step S9). The output value $P_{SOA}$ of the SOA output is also set to increase by a predetermined step width in response to the increase of the SOA current $I_{SOA}$ by the predetermined step width a. That is, after the processing of step S9 is performed, the CPU 19 outputs the SOA output set value with an increased value to the DAC 17 in order to suppress the increase in the voltage value of the VOA voltage $V_{VOA}$ with the increase in the SOA current set value (step S11). Note that, at this time, the SOA output set value is set not to exceed an upper limit value $P_{SOA\_MAX}$.

On the other hand, in step S7, when the SOA current set value is determined to set the SOA current $I_{SOA}$ to the maximum value $I_{SOA\_MAX}$, the CPU 19 sets the SOA output set value such that the voltage value of the VOA voltage $V_{VOA}$ output from the VOA control circuit 16 falls within the predetermined voltage set range (larger than the first threshold value $V_{VOA\_LOW}$ and equal to or smaller than the second threshold value $V_{VOA\_HIGH}$) (step S13). Note that, at this time, the SOA output set value is set not to exceed the upper limit value $P_{SOA\_MAX}$. When the SOA output set value is set, the VOA voltage $V_{VOA}$ (the monitor value after conversion into the digital value by the ADC 18) within the above-described voltage set range is input to the CPU 19.

In step S3, when the VOA voltage $V_{VOA}$ is determined to be larger than the first threshold value $V_{VOA\_LOW}$, the CPU 19 determines whether the VOA voltage $V_{VOA}$ is larger than the second threshold value $V_{VOA\_HIGH}$, including the transient state (that is, whether the region is the attenuation region) (step S17). When the voltage value of the VOA voltage $V_{VOA}$ is determined to be transiently larger than the second threshold value $V_{VOA\_HIGH}$ in step S17, the CPU 19 acquires the SOA current set value (step S19). Then, the CPU 19 determines whether the SOA current set value is the value that sets the SOA current $I_{SOA}$ to the minimum value $I_{SOA\_MIN}$ (step S21). In step S21, when the SOA current set value is determined to set the SOA current $I_{SOA}$ to a value larger than the maximum value $I_{SOA\_MIN}$, the CPU 19 sets the SOA current set value to a value that decreases the current value of the SOA current $I_{SOA}$ by the predetermined step width x (step S25). The output value $P_{SOA}$ of the SOA output also decreases by a predetermined step width as the SOA current $I_{SOA}$ decreases by the predetermined step width x. After the processing of S19 is performed, the CPU 19 outputs the SOA output set value with the decreased value to the DAC 17 in order to suppress a state in which the VOA voltage $V_{VOA}$ becomes smaller than the first threshold value $V_{VOA\_LOW}$ and the attenuation by the VOA 11 is not performed (step S27). Note that, at this time, the SOA output set value is set to be equal to or larger than the minimum value $P_{SOA}\_SAT$ in the attenuation region.

On the other hand, in step S17, when the VOA voltage $V_{VOA}$ is determined to be equal to or less than the second threshold value $V_{VOA\_HIGH}$, the SOA current $I_{SOA}$ and the SOA output set value are maintained (step S28), and the processing is moved onto the next processing. In step S7, when the SOA current set value is determined to set the SOA current $I_{SOA}$ to the maximum value $I_{SOA\_MAX}$, the CPU 19 sets the SOA output set value such that the VOA voltage $V_{VOA}$ output from the VOA control circuit 16 falls within the above-described voltage set range (equal to or larger than the first threshold value $V_{VOA\_LOW}$ and equal to or smaller than the second threshold value $V_{VOA\_HIGH}$) (step S13). Further, in step S21, when the SOA current set value is determined to set the SOA current $I_{SOA}$ to the minimum value $I_{SOA\_MIN}$, the CPU 19 sets the SOA output set value to the minimum value $P_{SOA}\_SAT$ (step S23).

When the processing of step S11, S13, S23, S27, or S28 is completed, the CPU 19 determines whether to continue the control (step S15). The processing of step Si is performed again when the control is continued, whereas the processing is completed when the control is not continued.

Next, functions and effects of the optical receiver 1 according to the present embodiment will be described.

In the optical receiver 1, the VOA voltage with the larger voltage value of the VOA voltage $V_{VOA}$ is output from the VOA control circuit 16 as the difference between the output value (the maximum value of the monitor signal) of the electrical signal output by the ROSA 14 and the SOA output set value is larger. Note that, for example, in the optical signal output from the SOA 12, four optical signals are multiplexed, and the optical power of the optical signal is about four times the optical power of a demultiplexed single optical signal input to each ROSA. Comparison between the SOA output set value and the output signal of the monitor circuit 15 is performed considering such a relationship. Then, an SOA current that determines an amplification amount of the SOA 12 is generated in accordance with the VOA voltage. In the steady state determined according to the optical input power and the transient state up to the steady state when power is supplied to the optical receiver 1 and the optical receiver 1 is started, the SOA current $I_{SOA}$ is set to the maximum value $I_{SOA\_MAX}$ in the case where the VOA voltage $V_{VOA}$ is set within the predetermined voltage set range (equal to or larger than the first threshold value $V_{VOA\_LOW}$ and equal to or smaller than the second threshold value $V_{VOA\_HIGH}$) (corresponding to the value of the amplification region in the steady state), the SOA current $I_{SOA}$ is set to a value smaller than the maximum value $I_{SOA\_MAX}$ and larger than the minimum value $I_{SOA\_MIN}$ in the case where the VOA voltage $V_{VOA}$ is transiently larger than the second threshold value $V_{VOA\_HIGH}$ (corresponding to the value of the gain reduction region in the steady state), and the SOA current $I_{SOA}$ is fixed to the minimum value $I_{SOA\_MIN}$ in the case where the VOA voltage $V_{VOA}$ is equal to or larger than the second threshold value $V_{VOA\_HIGH}$ (corresponding to the value of the attenuation region in the steady state).

In the steady state where the VOA voltage $V_{VOA}$ is substantially stable according to the optical input power, in the amplification region, the SOA current having the maximum value of the SOA current $I_{SOA\_MAX}$ that is the current upper limit value is supplied to the SOA 12. Therefore, the gain of the SOA 12 can be maximized. Therefore, the optical reception signal, which has been transmitted over a long distance and has a relatively small optical input power, can be amplified in a large manner. Further, by setting the maximum value $I_{SOA\_MAX}$ to an appropriate value, the output value (optical output power) of each optical signal after separation of the SOA output by the optical-demultiplexer 13 can be set equal to or smaller than the upper limit of the dynamic range of the ROSA 14.

In a similar steady state, in the gain reduction region, the SOA current having the current value of the SOA current $I_{SOA}$ smaller than the maximum value of the SOA current $I_{SOA\_MAX}$ and larger than the minimum value of the SOA current $I_{SOA\_MIN}$ is supplied to the SOA 12. When the SOA current becomes an excessively low current, the reception error rate becoming high and the output value of each optical signal after separation of the SOA output by the optical-demultiplexer 13 easily falling outside the dynamic range of the ROSA 14 are the problems. In this respect, for example, by setting a current lower limit value to the extent that the problems do not occur, as the minimum value $I_{SOA\_MIN}$, and adjusting the current value of the SOA current $I_{SOA}$ to a value larger than the minimum value $I_{SOA\_MIN}$, occurrence of the above problems can be suppressed.

Further, in the steady state, even in the attenuation region, the SOA current is fixed to the minimum value $I_{SOA\_MIN}$ of the gain reduction region and the attenuation region. Therefore, occurrence of the above problems can be suppressed. In the attenuation region where the SOA current is fixed to the minimum value $I_{SOA\_MIN}$, the VOA voltage $V_{VOA}$ becomes large and the attenuation amount of the VOA 11 increases when the optical input power to the optical receiver 1 further increases. Accordingly, when the optical input power to the optical receiver 1 increases, the attenuation amount of the VOA 11 can be increased to correspond to the increase, and even when the SOA current is fixed to the minimum value $I_{SOA\_MIN}$, the output value of each optical signal after separation of the SOA output by the optical-demultiplexer 13 can be set to fall within the dynamic range of the ROSA 14.

Note that, for example, in the case where the current value of the SOA current is fixed not only in the attenuation region but also in the amplification region and in the gain reduction region, the SOA current is fixed to a large value in order to set the output value of the SOA output to fall within the dynamic range of the ROSA even when the optical input power to the SOA is close to the lower limit value of the dynamic range of the wavelength multiplexed signal required for the optical receiver. In this case, on the contrary, when the optical input power to the optical receiver 1 becomes close to the upper limit value of the dynamic range, the optical signal largely attenuated by the VOA is largely amplified by the SOA. When the signal once attenuated by the VOA 11 is amplified by the SOA 12 as described above, there is a risk that the reception error rate becomes high when a light source with a low extinction ratio, a stressed waveform, or the like is received. In this respect, in the optical receiver 1, the current value of the SOA current $I_{SOA}$ is not fixed in the region other than the attenuation region. Therefore, the gain of the SOA 12 can be determined in accordance with the SOA current $I_{SOA}$, and the attenuation amount by the VOA 11 can be a necessary minimum. Then, in the case where the SOA current $I_{SOA}$ is set to a fixed value in the attenuation region, the SOA current $I_{SOA}$ can be made as small as possible as the minimum value $I_{SOA\_MIN}$. Therefore, the gain of the SOA 12 can be made small and the attenuation amount by the VOA 11 can be set to the necessary minimum. By setting the attenuation amount by the VOA 11 to the necessary minimum, an increase in the reception error rate can be suppressed when a light source with a low extinction ratio, a stressed waveform, or the like is received.

Further, in the optical receiver 1, the VOA control circuit 16 compares the output value (monitor signal maximum value) of the electrical signal having the maximum output value in the electrical signals output by the ROSAs 14a, 14b, 14c, and 14d with the SOA output set value. Note that, as described above, for example, in the optical signal output from the SOA 12, four optical signals are multiplexed, and the optical power of the optical signal is about four times the optical power of a demultiplexed single optical signal input to each ROSA. Comparison between the SOA output set value and the output signal of the monitor circuit 15 is performed considering such a relationship. With the comparison, the VOA voltage with the maximum VOA voltage $V_{VOA}$ in the VOA voltages outputtable to the SOA output of the same output value $P_{SOA}$ is output from the VOA control circuit 16. Here, in the gain reduction region, the SOA current $I_{SOA}$ and the SOA output power $P_{SOA}$ are controlled to become smaller as the voltage value of the VOA voltage $V_{VOA}$ is larger. For example, in the gain reduction region, when a VOA voltage based on an electrical signal with an output value that is not the maximum is output from the VOA control circuit 16, the SOA current $I_{SOA}$ becomes larger than the case where the VOA voltage based on the electrical signal with the output value that is the monitor signal maximum value is output. In the gain reduction region, when the current value of the SOA current $I_{SOA}$ is not a value considering the monitor signal maximum value, the SOA output power $P_{SOA}$ becomes larger than the case where the current value of the SOA current $I_{SOA}$ is the value considering the monitor signal maximum value. Therefore, there is a risk that the output value after separation of the SOA output (that is, the optical input power of the ROSA 14) exceeds the upper limit value of the dynamic range of the ROSA 14. In this regard, by using the SOA current in accordance with the VOA value with the maximum voltage value in the outputtable VOA voltages $V_{VOA}$ (by using the SOA current $I_{SOA}$ with the current value that is the value considering the monitor signal maximum value), exceeding the upper limit value of the dynamic range of the ROSA 14 by the output value after separation of the SOA output can be effectively suppressed.

Further, in the optical receiver 1, the CPU 19 increases the SOA current $I_{SOA}$ by the predetermined step width (increase value) a when the VOA voltage $V_{VOA}$ is smaller than the first threshold value $V_{VOA\_LOW}$, and the SOA current $I_{SOA}$ is not equal to the predetermined maximum value $I_{SOA\_MAX}$ (current upper limit value). In this case, the CPU 19 can gradually increase the SOA current $I_{SOA}$ with the predetermined step width (increase value) while performing feedback control when the VOA voltage $V_{VOA}$ is smaller than the first threshold value $V_{VOA\_LOW}$. By gradually increasing the SOA current $I_{SOA}$ with the predetermined step width, sudden increase in the optical signal to be input to the light receiving element of the ROSA 14 can be suppressed when the optical input to the optical receiver 1 is relatively large. With the operation, deterioration of the function of the light receiving element of the ROSA 14 due to a large optical signal can be suppressed. Alternatively, at the initial setting, by setting the SOA current $I_{SOA}$ to a sufficiently small value (e.g. zero) so that the SOA output power $P_{SOA}$ does not exceed the upper limit value of the ROSA overload standard even if the optical input power that reaches the upper limit value of the overload standard of the optical receiver 1 is input, and by setting the SOA output set value to a sufficiently small value, the ROSA 14 can be protected from an input of excessive optical input power even when the optical reception signal of relatively large optical input power is received after the start.

Although the embodiment of the present invention has been described, the present invention is not limited to the above embodiment.

Figure 4:
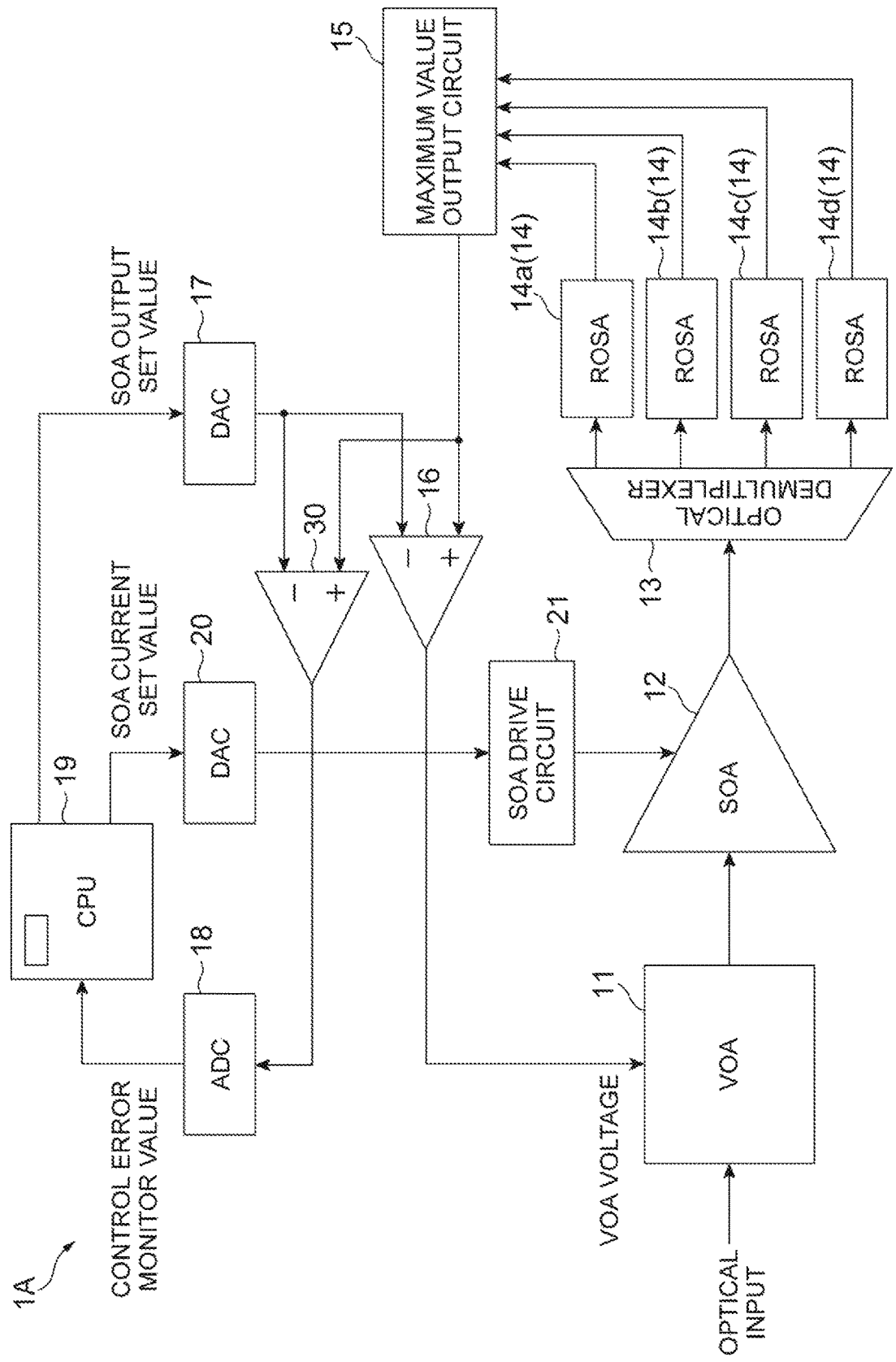
FIG. 4 is a functional block diagram schematically illustrating an optical receiver according to a modification of an embodiment of the present invention.

For example, as in an optical receiver 1A illustrated in FIG. 4, a differential amplifier circuit 30 is separately provided from the VOA control circuit 16, and the SOA current may be controlled on the basis of a control error signal output from the differential amplifier circuit 30. In this case, the VOA control circuit 16 outputs the VOA voltage only to the VOA 11. The differential amplifier circuit 30 compares the output value (monitor signal maximum value) of the electrical signal output by the ROSA 14 with the SOA output set value, and outputs the control error signal (determination signal) to be used for determination of the SOA current set value in accordance with a result of the comparison, similarly to the VOA control circuit 16. Analog/digital (AD) conversion is performed for an output value of the control error signal by the ADC 18 and the converted output value is output to the CPU 19 as a control error monitor value. The CPU 19 determines the SOA current set value in accordance with the control error monitor value. By providing the differential amplifier circuit 30 separately from the VOA control circuit 16 in this way, the SOA current can be controlled in accordance with the output value (control error monitor value) of the control error signal, that is an independent signal from the VOA voltage output from the VOA control circuit 16. With the configuration, even in the state where the output value of the VOA voltage output from the VOA control circuit 16 is small (a state before the VOA 11 starts operation), the gain and the voltage range of the control error signal output from the differential amplifier circuit 30 can be set to values suitable for control of the SOA current. Therefore, more accurate control of the SOA current becomes possible.

Figure 5:
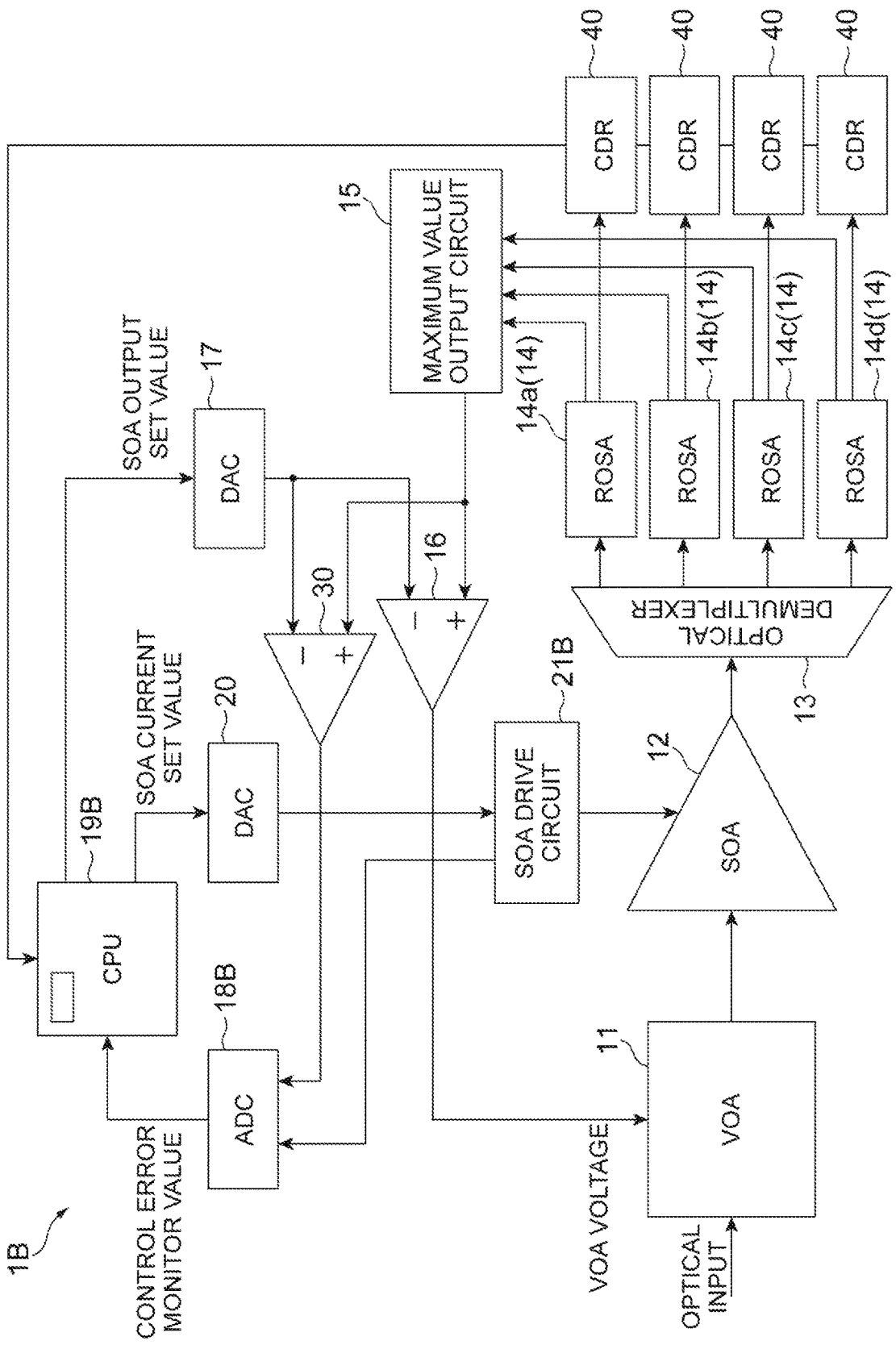
FIG. 5 is a functional block diagram schematically illustrating an optical receiver according to another modification of an embodiment of the present invention.

Further, for example, as in an optical receiver 1B illustrated in FIG. 5, a configuration to output the current value of the SOA current from an SOA drive circuit 21B to an ADC 18B (a configuration to monitor the SOA current) is employable. In the optical transceiver, each data bit of the electrical signal output from the ROSA 14 is discriminated by clock data recovery (CDR) 40 or Gearbox IC illustrated in FIG. 5. At this time, an optimum set value of a predetermined threshold used for discrimination is converted in accordance with the SOA gain. Therefore, in the optical receiver 1B, the SOA current is monitored, and the optimum set value of the threshold used for discrimination is determined on the basis of the current value of the SOA current and a predetermined calculation formula or a lookup table. Specifically, a CPU 19B sets an initial set value of the above-described threshold value for each CDR 40 that receives the electrical signal output from each lane (each channel) of the ROSA 14. The initial set value is an optimum set value when the SOA current is set to the current upper limit value. When the current value (monitor current value) of the SOA current is output from the SOA drive circuit 21B, the CPU 19B calculates a correction value from a difference between the monitor current value and the current upper limit value. Then, the CPU 19B corrects the initial set value in accordance with the correction value to set the optimum set value in accordance with the current SOA current to each CDR 40. Thereby, under a condition that the optical input power to the optical receiver 1B is particularly large, a set value selected for a condition of small optical input power can be corrected (adjusted) to an optimum set value, and a sufficient margin can be secured.

In addition, the description has been made such that the optical receiver receives the multiplexed signal in which four optical signals having different wavelengths from one another are multiplexed. However, the present invention is not limited to the example, and the optical receiver may just be an optical receiver that receives a multiplexed signal in which at least two optical signals having different wavelengths from each other are multiplexed. Also, the description has been made such that the VOA control circuit uses the monitor signal maximum value as the output value of the electrical signal output by the ROSA. However, the present invention is not limited to the example, and for example, the VOA control circuit may use an average value of the output values of the electrical signals, for example.

Further, the description has been made such that the dynamic ranges of the four ROSAs are common to one another. However, the present invention is not limited to the example, and the dynamic ranges of the four ROSAs may be different from one another.

What is claimed is:

1. An optical receiver for receiving an optical reception signal, the optical receiver comprising:
 a variable optical attenuator configured to output a first optical signal obtained by attenuating the optical reception signal with an attenuation amount increasing or decreasing in accordance with a first control signal;
 a semiconductor optical amplifier configured to output a second optical signal obtained by amplifying the first optical signal with a gain increasing or decreasing in accordance with a second control signal;
 an optical receiving unit configured to convert the second optical signal into an electrical signal and output a monitor signal in accordance with the electrical signal;
 a comparison circuit configured to compare the monitor signal with an output set signal and generate the first control signal in accordance with a result of the comparison; and
 a control unit configured to generate the second control signal and the output set signal in accordance with the first control signal, wherein
 the comparison circuit makes the first control signal larger as a difference between the monitor signal and the output set signal becomes larger when the monitor signal is larger than the output set signal, and outputs an output value within a predetermined range as the first control signal when the monitor signal is smaller than the output set signal,
 the variable optical attenuator makes the attenuation amount larger when the first control signal becomes larger and makes the attenuation amount smaller when the first control signal becomes smaller,
 the semiconductor optical amplifier makes the gain larger when the second control signal becomes larger and makes the gain smaller when the second control signal becomes smaller, and wherein the control unit
 increases the second control signal by a first increase value within a first range smaller than a first upper limit value, and increases the output set signal in accordance with the first increase value within a second range smaller than a second upper limit value set in accordance with the first upper limit value, when the first control signal is smaller than a first threshold value,
 decreases the second control signal by a first decrease value within a third range larger than a first lower limit value smaller than the first upper limit value, and decreases the output set signal in accordance with the first decrease value within a fourth range larger than a second lower limit value set in accordance with the first lower limit value, when the first control signal is within an active range larger than a second threshold value larger than the first threshold value, and maintains the second control signal and the output set signal when the first control signal falls within an inactive range equal to or larger than the first threshold value and equal to or smaller than the second threshold value.

2. The optical receiver according to claim 1, wherein the optical reception signal is configured by multiplexing a plurality of optical signals having different peak wavelengths from one another, and the optical receiving unit includes an optical-demultiplexer configured to separate the optical reception signal into the plurality of optical signals, a plurality of receiver optical sub assemblies (ROSAs) configured to generate a plurality of electrical signals according to the plurality of optical signals, and a monitor signal circuit configured to output an electrical signal having a maximum output value among the plurality of electrical signals, as the monitor signal.

3. The optical receiver according to claim 2, wherein, in a steady operation state of the optical receiver, the control unit sets, when the first control signal falls within the inactive range, the second control signal to the first upper limit value until optical power of the optical reception signal reaches a first boundary value, and decreases the second control signal with an increase in the optical power of the optical reception signal until the optical power of the optical reception signal exceeds the first boundary value and reaches a second boundary value larger than the first boundary value, and the control unit sets the second control signal to the second lower limit value when the first control signal is larger than the second threshold value.

4. The optical receiver according to claim 3, wherein, when the first boundary value is Pina (dbm), the control unit sets Pina to satisfy an expression $$Pina = P_{SOA\_MAX} - Gmax + L$$

where the attenuation amount of the variable optical attenuator is L (dB), the gain of the semiconductor optical amplifier when the second control signal is set to the first upper limit value is Gmax (dB), and the second upper limit value of the semiconductor optical amplifier is $P_{SOA\_MAX}$ (dBm).

5. The optical receiver according to claim 2, wherein each of the plurality of ROSAs makes a magnitude of the electrical signal to be generated by the each of the plurality of ROSAs large when optical power of the optical signal received by the each of the plurality of ROSAs is large, and makes the magnitude of the electrical signal to be generated by the each of the plurality of ROSAs small when the optical power of the optical signal received by the each of the plurality of ROSAs is small.

6. The optical receiver according to claim 5, wherein the second upper limit value is set such that the optical signal received by each of the plurality of ROSAs becomes smaller than an upper limit value of a dynamic range.

7. The optical receiver according to claim 5, wherein the first lower limit value is set such that waveform distortion due to a pattern effect is suppressed in the semiconductor optical amplifier.

8. A method of controlling an optical receiver configured to receive an optical reception signal, and including:

a variable optical attenuator configured to output, in response to a first control signal, a first optical signal obtained by attenuating the optical reception signal with an attenuation amount becoming larger as the first control signal is larger and becoming smaller as the first control signal is smaller, a semiconductor optical amplifier configured to output, in response to a second control signal, a second optical signal obtained by amplifying the first optical signal with a gain becoming larger as the second control signal is larger and becoming smaller as the second control signal is smaller, an optical receiving unit configured to convert the second optical signal into an electrical signal and output a monitor signal in accordance with the electrical signal, a comparison circuit configured to compare the monitor signal with an output set signal and generate the first control signal in accordance with a result of the comparison, and a control unit configured to generate the second control signal and the output set signal in accordance with the first control signal, the method comprising:

making the first control signal larger as a difference between the monitor signal and the output set signal becomes larger when the monitor signal is larger than the output set signal, and outputting an output value within a predetermined range as the first control signal when the monitor signal is smaller than the output set signal;

increasing the second control signal by a first increase value within a first range smaller than a first upper limit value and increasing the output set signal in accordance with the first increase value within a second range smaller than a second upper limit value set in accordance with the first upper limit value when the first control signal is smaller than a first threshold value;

decreasing the second control signal by a first decrease value within a third range larger than a first lower limit value smaller than the first upper limit value and decreasing the output set signal in accordance with the first decrease value within a fourth range larger than a second lower limit value set in accordance with the first lower limit value when the first control signal is within an active range larger than a second threshold value larger than the first threshold value; and maintaining the second control signal and the output set signal when the first control signal falls within an active range equal to or larger than the first threshold value and equal to or smaller than the second threshold value.

9. The method of controlling an optical receiver according to claim 8, wherein the optical reception signal is configured by multiplexing a plurality of optical signals having different peak wavelengths from one another, the method further comprising:

separating the optical reception signal into the plurality of optical signals;

generating a plurality of electrical signals according to the plurality of optical signals; and outputting an electrical signal having a maximum output value among the plurality of electrical signals, as the monitor signal.

10. The method of controlling an optical receiver according to claim 9, the method further comprising:

setting the second control signal to the first upper limit value until optical power of the optical reception signal reaches a first boundary value when the first control signal falls within the inactive range; and decreasing the second control signal with an increase in the optical power of the optical reception signal until the optical power of the optical reception signal exceeds the first boundary value and reaches a second boundary value larger than the first boundary value, and setting the second control signal to the second lower limit value when the first control signal is larger than the second threshold value.

11. The method of controlling an optical receiver according to claim 10, the method further comprising:

when the first boundary value is Pina (dbm), setting, by the control unit, Pina to satisfy an expression $$Pina = P_{SOA\_MAX} - Gmax + L$$

where the attenuation amount of the variable optical attenuator is L (dB), the gain of the semiconductor optical amplifier when the second control signal is set to the first upper limit value is Gmax (dB), and the second upper limit value of the semiconductor optical amplifier is $P_{SOA\_MAX}$ (dBm).

12. The method of controlling an optical receiver according to claim 9, wherein the generating of the plurality of electrical signals includes making magnitudes of the electrical signals corresponding to the plurality of optical signals large when optical power of the plurality of optical signals is large, and making the magnitudes of the electrical signals corresponding to the plurality of optical signals small when the optical power of the plurality of optical signals is small.

13. The method of controlling an optical receiver according to claim 12, the method further comprising:

setting the second upper limit value such that the optical signal received by each of a plurality of ROSAs becomes smaller than an upper limit value of a dynamic range.

14. The method of controlling an optical receiver according to claim 12, the method further comprising:

setting the first lower limit value such that waveform distortion due to a pattern effect does not occur in the semiconductor optical amplifier.

15. An optical receiver for receiving an optical reception signal having an optical input power, the optical receiver comprising:

a variable optical attenuator (VOA) configured to attenuate the optical reception signal by an attenuation amount variable in response to a first control signal and output an attenuated optical reception signal as a first optical signal;

a semiconductor optical amplifier (SOA) configured to amplify the first optical signal by a gain variable in response to a second control signal and output an amplified first optical signal as a second optical signal;

an optical receiving unit including an optical demultiplexer, a receiver optical sub assembly (ROSA), and a monitor circuit, the ROSA being configured to receive the second optical signal through the optical demultiplexer and convert the second optical signal into an electrical signal, the monitor circuit being configured to output a monitor signal in accordance with the electrical signal from the ROSA;

a comparison circuit configured to compare the monitor signal with an output set signal and generate the first control signal in accordance with a result of the comparison; and a control unit including an analog-to-digital converter (ADC), a central processing unit (CPU), a first digital-to-analog converter (DAC), a second DAC, and a drive circuit, the CPU being configured to monitor the first control signal through the ADC and generate the second control signal and the output set signal in accordance with the first control signal, the second control signal being provided to the SOA through the first DAC and the drive circuit, the output set signal being provided to the comparison circuit through the second DAC, wherein the comparison circuit increases the first control signal as a difference between the monitor signal and the output set signal increases, and decreases the first control signal as the difference between the monitor signal and the output signal decreases when the monitor signal is larger than the output set signal, and outputs an output value within a predetermined range as the first control signal when the monitor signal is smaller than the output set signal, the VOA increases the attenuation amount when the first control signal increases and decreases the attenuation amount when the first control signal decreases, the SOA increases the gain when the second control signal increases and decreases the gain when the second control signal decreases, and the control unit sets the second control signal to a first upper limit value ($I_{SOA\_MAX}$) and increases the output set signal with an increase in the optical input power for keeping the first control signal within an inactive range between a first threshold value ($V_{VOA\_HIGH}$) and a second threshold value ($V_{VOA\_LOW}$) smaller than $V_{VOA\_HIGH}$, when the optical input power is in a first region smaller than a first boundary value (Pina), decreases the second control signal from $I_{SOA\_MAX}$ to a first lower limit value ($I_{SOA\_MIN}$) smaller than $I_{SOA\_MAX}$ with an increase in the optical input power, and decreases the output set signal from a second upper limit value ($P_{SOA\_MAX}$) to a second lower limit value ($P_{SOA\_SAT}$) with the increase in the optical input power for keeping the first control signal within the inactive range, when the optical input power is in a second region between Pina and a second boundary value (Pinb) larger than Pina, and maintains the second control signal to $I_{SOA\_MIN}$ and the output set signal to $P_{SOA\_SAT}$ against an increase in the optical input power for adjusting the first control signal in an active range larger than $V_{VOA\_HIGH}$, when the optical input power is in a third region larger than Pinb.

16. The optical receiver according to claim 15, wherein the optical receiving unit further includes additional ROSAs, the optical demultiplexer separates separate optical signals from the second optical signal, the ROSA and the additional ROSAs convert the separate optical signals into separate electrical signals, and a monitor circuit detects a maximum value of the separate electrical signals and outputs an output value corresponding to the maximum value as the monitor signal.

17. The optical receiver according to claim 15, wherein the control unit sets the second control signal to a first initial value smaller than $I_{SOA\_MAX}$ and the output set signal to a second initial value smaller than $P_{SOA\_MAX}$ when the optical receiver is activated or restarted, and the control unit gradually increases the second control signal from the first initial value by a first increase value and the output set signal from the second initial value determined by the first initial value until the second control signal reaches $I_{SOA\_MAX}$ or the first control signal enters the inactive range, when the optical input power is in the first region.

18. A method of controlling an optical receiver configured to receive an optical reception signal having an optical input power, and including:
a variable optical attenuator (VOA) configured to attenuate the optical reception signal by an attenuation amount variable in response to a first control signal and output an attenuated optical reception signal as a first optical signal,
a semiconductor optical amplifier (SOA) configured to amplify the first optical signal by a gain variable in response to a second control signal and output an amplified first optical signal as a second optical signal,
an optical receiving unit including an optical demultiplexer, a receiver optical sub assembly (ROSA), and a monitor circuit, the ROSA being configured to receive the second optical signal through the optical demultiplexer and convert the second optical signal into an electrical signal, the monitor circuit being configured to output a monitor signal in accordance with the electrical signal,
a comparison circuit configured to compare the monitor signal with an output set signal and generate the first control signal in accordance with a result of the comparison, and
a control unit including an analog-to-digital converter (ADC), a central processing unit (CPU), a first digital-to-analog converter (DAC), a second DAC, and a drive circuit, the CPU being configured to monitor the first control signal through the ADC and generate the second control signal and the output set signal in accordance with the first control signal, the second control signal being provided to the SOA through the first DAC and the drive circuit, the output set signal being provided to the comparison circuit through the second DAC,
the method comprising:
increasing the first control signal as a difference between the monitor signal and the output set signal increases, and decreasing the first control signal as the difference between the monitor signal and the output set signal decreases when the monitor signal is larger than the output set signal, and outputting an output value within a predetermined range as the first control signal when the monitor signal is smaller than the output set signal;

increasing the attenuation amount when the first control signal increases and decreasing the attenuation amount when the first control signal decreases,
increasing the gain when the second control signal increases and decreasing the gain when the second control signal decreases, and setting the second control signal to a first upper limit value ($I_{SOA\_MAX}$) and increasing the output set signal with an increase in the optical input power for keeping the first control signal within an inactive range between a first threshold value ($V_{VOA\_HIGH}$) and a second threshold value ($V_{VOA\_LOW}$) smaller than ($V_{VOA\_HIGH}$), when the optical input power is in a first region smaller than a first boundary value (Pina);
decreasing the second control signal from $I_{SOA\_MAX}$ to a first lower limit value ($I_{SOA\_MIN}$) smaller than $I_{SOA\_MAX}$ with an increase in the optical input power, and decreasing the output set signal from a second upper limit value ($P_{SOA\_MAX}$) to a second lower limit value ($P_{SOA\_SAT}$) with the increase in the optical input power for keeping the first control signal within the inactive range, when the optical input power is in a second region between Pina and a second boundary value (Pinb) larger than Pina; and
maintaining the second control signal to $I_{SOA\_MIN}$ and the output set signal to $P_{SOA\_SAT}$ against an increase in the optical input power for adjusting the first control signal in an active range larger than $V_{VOA\_HIGH}$, when the optical input power is in a third region larger than Pinb.

19. The method of controlling an optical receiver according to claim 18, wherein the optical receiving unit further includes additional ROSAs,
the method further comprising;
separating separate optical signals from the second optical signal;
converting the separate optical signals into separate electrical signals; and
detecting a maximum value of the separate electrical signals and outputting an output value corresponding to the maximum value as the monitor signal.

20. The method of controlling an optical receiver according to claim 18,
the method further comprising:
setting the second control signal to a first initial value smaller than $I_{SOA\_MAX}$ and the output set signal to a second initial value smaller than $P_{SOA\_MAX}$ when the optical receiver is activated or restarted; and
gradually increasing the second control signal from the first initial value by a first increase value and the output set signal from the second initial value determined by the first initial value until the second control signal reaches $I_{SOA\_MAX}$ or the first control signal enters the inactive range, when the optical input power is in the first region.

\* \* \* \* \*